United States Patent
Samuels et al.

(10) Patent No.: US 10,918,082 B2
(45) Date of Patent: Feb. 16, 2021

(54) EQUINE GROOMING DEVICE AND METHOD FOR USE OF SUCH A DEVICE FOR KEEPING A HORSE MANE'S BRAID IN A ROLLED UP OR FOLDED KNOT

(71) Applicant: HES-tec B.V., Drunen (NL)

(72) Inventors: Erwin Lambertus Leonardus Samuels, Elshout (NL); Frank Van Helvert, Drunen (NL)

(73) Assignee: HES-tec B.V., Drunen (NL)

( * ) Notice: Subject to any disclaimer, the term of this patent is extended or adjusted under 35 U.S.C. 154(b) by 619 days.

(21) Appl. No.: 15/704,543

(22) Filed: Sep. 14, 2017

(65) Prior Publication Data
US 2019/0075757 A1   Mar. 14, 2019

(51) Int. Cl.
A01K 13/00   (2006.01)
A45D 8/00   (2006.01)
D04C 7/00   (2006.01)

(52) U.S. Cl.
CPC ............ A01K 13/00 (2013.01); A45D 8/00 (2013.01); D04C 7/00 (2013.01)

(58) Field of Classification Search
CPC .................................................. A01K 13/00
USPC ....... 132/273, 275, 276–281, 144, 146, 101, 132/105; 119/600, 612, 651, 664; 54/87, 54/75
See application file for complete search history.

(56) References Cited

U.S. PATENT DOCUMENTS

| | | | | |
|---|---|---|---|---|
| 150,997 A | * | 5/1874 | Alright | |
| 202,111 A | * | 4/1878 | Lebland | |
| 279,382 A | * | 6/1883 | Hayes | |
| 279,677 A | * | 6/1883 | Walker | |
| 313,189 A | * | 3/1885 | Eberhard | |
| 389,387 A | * | 9/1888 | Ireland | |
| 546,109 A | * | 9/1895 | Young | |
| 764,165 A | * | 7/1904 | Tojetti | |
| 996,596 A | * | 6/1911 | Scharer | |
| 1,126,752 A | * | 2/1915 | Goldberg | A45D 8/06 132/281 |
| 1,221,996 A | * | 4/1917 | Kahn | A45D 8/24 132/278 |
| 1,241,960 A | * | 10/1917 | Gould | A45D 8/30 132/137 |

(Continued)

FOREIGN PATENT DOCUMENTS

DE   29603945 U1   6/1996

OTHER PUBLICATIONS

"Quick Knot—Photos Facebook", Aug. 16, 2017, Retrieved from the Internet: https://www.facebook.com/1903741869878871/photos/a.1905743539678704.1073741827.1903741869878871/1905743513012040/?type=3&theater (Nov. 22, 2017).

(Continued)

*Primary Examiner* — Richard T Price, Jr.
(74) *Attorney, Agent, or Firm* — The Webb Law Firm (57) ABSTRACT

An equine grooming device for maintaining a horse mane's braid has at least one pin and a limiter. The pin forms or receives a securing element. The securing element prevents movement of the pin in a direction opposite to a stitching direction. The limiter may include a retainer element. The securing element may be formed by deforming at least part of the pin. A method for use of an equine grooming device for maintaining a horse's braid is also disclosed.

18 Claims, 6 Drawing Sheets

(56) References Cited

U.S. PATENT DOCUMENTS

| | | | | |
|---|---|---|---|---|
| 1,392,711 A * | 10/1921 | Sitz | A45D 8/08 | 132/281 |
| 1,508,161 A * | 9/1924 | Christian | A45D 8/06 | 132/281 |
| 2,437,502 A * | 3/1948 | Butler | A45D 8/10 | 132/280 |
| 2,567,583 A * | 9/1951 | Stromer | A45D 8/06 | 132/275 |
| 2,664,883 A * | 1/1954 | Smith | A45D 8/14 | 132/281 |
| 3,081,781 A * | 3/1963 | Stermer | A45D 8/34 | 132/273 |
| 3,131,189 A * | 4/1964 | Klass | C07D 215/10 | 546/102 |
| 3,330,287 A * | 7/1967 | Muhs | A45D 8/02 | 132/281 |
| 3,645,280 A * | 2/1972 | Cutler | A41G 3/00 | 132/53 |
| 3,659,622 A * | 5/1972 | Meerson | A41G 3/00 | 132/53 |
| 3,983,886 A * | 10/1976 | Harbison | A45D 44/00 | 132/212 |
| 4,972,859 A * | 11/1990 | Noviello, Jr. | A45D 8/34 | 132/273 |
| 5,251,650 A * | 10/1993 | Edmark | A45D 8/02 | 132/200 |
| 5,284,167 A * | 2/1994 | Gill | A45D 8/34 | 132/129 |
| 5,323,793 A * | 6/1994 | Lorenzi | A45D 8/24 | 132/145 |
| 5,396,912 A * | 3/1995 | Chou | A45D 8/24 | 132/278 |
| 5,709,013 A * | 1/1998 | Stanback | A44B 6/00 | 132/273 |
| 5,785,065 A * | 7/1998 | Johnson | A45D 8/00 | 132/273 |
| 5,896,863 A * | 4/1999 | Smith | A45D 8/06 | 132/210 |
| 5,901,713 A * | 5/1999 | Mroczek | A45D 8/34 | 132/273 |
| 5,934,294 A * | 8/1999 | Chiang | A45D 8/00 | 132/275 |
| 5,937,872 A * | 8/1999 | Wang | A45D 8/36 | 132/273 |
| 5,960,668 A * | 10/1999 | Tseng | F16H 27/045 | 74/444 |
| 6,164,291 A * | 12/2000 | Filippone | A45D 8/34 | 132/273 |
| 6,263,884 B1 * | 7/2001 | Minnelli | A45D 8/34 | 132/201 |
| 6,427,702 B1 * | 8/2002 | Silva | A45D 8/12 | 132/144 |
| 2001/0008065 A1 | 7/2001 | Sloan | | |
| 2006/0144416 A1 * | 7/2006 | Neal | A45D 8/36 | 132/275 |
| 2011/0000499 A1 * | 1/2011 | Hsu | A45D 8/12 | 132/219 |
| 2011/0023906 A1 * | 2/2011 | Tu | A45D 8/14 | 132/278 |
| 2011/0297179 A1 * | 12/2011 | Tu | A45D 8/36 | 132/278 |
| 2011/0319722 A1 * | 12/2011 | Lindegger | H02J 7/0047 | 600/300 |
| 2012/0012132 A1 * | 1/2012 | Kowalski | B05D 3/12 | 132/279 |
| 2012/0090636 A1 * | 4/2012 | Tsai | A45D 8/28 | 132/278 |
| 2013/0167866 A1 * | 7/2013 | Wright | A45D 8/34 | 132/273 |
| 2014/0338694 A1 * | 11/2014 | Van Dyne | A44C 25/007 | 132/275 |
| 2015/0114416 A1 * | 4/2015 | Lee | A41G 5/0073 | 132/54 |
| 2016/0015143 A1 * | 1/2016 | Hsu | A45D 8/14 | 132/276 |
| 2016/0183656 A1 * | 6/2016 | Karam | A41G 5/0093 | 132/275 |

OTHER PUBLICATIONS

"Knotten maken was nog nooit zo gemakkelijk met de Quick Knot!", Sep. 1, 2017, XP055427813, Retrieved from the Internet: https://drunensruiterhuis.nl/nl/blog/adviestool/knotten-maken-was-nog-nooit-zo-gemakkelijk-met-de-quick-knot (Nov. 22, 2017).

* cited by examiner

EQUINE GROOMING DEVICE AND METHOD FOR USE OF SUCH A DEVICE FOR KEEPING A HORSE MANE'S BRAID IN A ROLLED UP OR FOLDED KNOT

BACKGROUND OF THE INVENTION

Field of the Invention

The present invention related to an equine grooming device for keeping a horse mane's braid in a rolled up or folded knot. The invention further relates to a method for use of an equine grooming device for keeping a horse mane's braid in a rolled up or folded knot.

Description of Related Art

Traditionally the mane of horses are braided, or plaited, before a competition. Braided or plaited mane have a positive influence on the aesthetic appearance of the horse, but they also prevent disturbance of the rider due to lose mane and they prevent that mane get tangled out. A benefit of providing braids in the mane of a horse is that they may accentuate the curve of the horse's neck, which for example during dressage normally will improve the overall appearance of the horse and rider. At some type of competitions, such as showing or hunter classes, it may even be mandatory to present the horse with braided mane. Also at some type of competitions grooms are awarded for their braids.

Braiding a horse in the conventional way starts for example with dividing the mane into various sections depending on the desired number of braids. Each section of hair is for instance divided into three equal smaller sections, or strands, and the hair is braided all the way down. Preferably the braid is fastened with an elastic band, for example a rubber or silicone plaiting band. Subsequently, the braid is folded or rolled up into a knot. Conventionally the knot is fastened either by using an elastic band or by using needle and thread or yarn. However, the conventional methods of braiding mane of a horse are not only time consuming, but have several other drawbacks. When fastening the knot with the use of an elastic band it is difficult to obtain the ideal degree of tightening of the knot. The knot is either too loose, resulting in braids popping out of the knots when the horse stretches his neck or when the riders rubs over the mane while riding. Another possibility with using elastic bands is that the knots are fastened too tight, resulting in that hairs will be pulled out by the created tension. Furthermore, it is usually difficult to remove the elastic bands after use without damaging the mane. The last mentioned problem is also known for the method where the fastening of the knots is done by using needle and thread. As the thread is sewed through the mane, in particular through the braid, it is almost impossible to remove the thread without using scissors. A risk of using is scissors is that part of the mane may be cut as well as during the removal of the thread, resulting in undesired loss of mane. Damaging the mane, as will be apparent, is undesired as it may cause difficulties for the following session of braiding the mane. Especially when a horse competes at a regular basis, and therefore also requires regular braiding, it is of importance to keep the mane in a healthy condition.

A goal of the invention is to provide an improved aid for keeping a horse mane's braid in a rolled up or folded knot.

SUMMARY OF THE INVENTION

The invention provides for this purpose and equine grooming device. Braiding mane of a horse by using an equine grooming device, or equine grooming aid, according to the invention has several benefits with respect to braiding via a conventional manner using elastic bands or needle and thread. One of the benefits is that braiding the mane of a horse by using a device according to the invention is less labour-intensive than braiding via a conventional method. Using a device according to the invention reduces the number of acts to be done by the groom to bring the knot in a folded a rolled up position, resulting in that the new method of braiding is less time consuming than braiding according a conventional method. An example of the steps to be performed by using a device according to the invention is outlined in the enclosed figures. Because at least the first part of the pin is substantially elongated, or substantially straight, the device may relatively easily be pierced through the knot. This also enables easy removal of the device from the knot after use when the device is un-secured and is subsequently pulled or pushed into a direction reverse to the stitching direction. The function of the limiter is to prevent that the device may be entirely pulled through the knot. Because the limiter comprises a stop, for instance a stop surface, for engaging a first side of the knot, the movement of the device will be limited in the stitching direction once the device is at least partially pierced through the knot. It is a benefit that movement of the pin may be prevented in a direction which is reverse to the stitching direction as this enables the device to be secured with respect to the knot. This securing step is done by making use of the second part of the pin. The second part of the pin is configured to form a securing element and/or by receiving a securing element. The securing element ensures that the knot maintains its shape.

The use of a device according to the invention provides an increased repeatability and reproducibility of similar looking knots. This results in an increased uniformity of knots which has a positive effect on the aesthetic appearance of the knots and therefore on the aesthetic appearance of the horse.

As outlined above, the number of acts to be performed by a user (groom) to provide a horse with knots is reduced by using a device according to the invention compared to conventional methods. Furthermore, applying a device according to the invention does not require specific skills, excessive force and/or effort of the user. As a result, the chance that a user would suffer from cramp or RSI of limbs, such as fingers, is reduced.

Another benefit of the device according to the invention is that it is possible to use the device in combination with any folding or rolling technique of braids.

In a preferred embodiment, the limiter and the securing element are configured to enclose the knot at least partially. Enclosing at least part of the knot between the limiter and the securing element the device ensures that the horse mane's brain may easily be kept in the knot at a preferred degree of tightness regardless the dimensions of the knot. It is to be understood that mane of a horse are often not uniform in thickness over the full neck, resulting in varying dimensions of the plurality of knots of a horse. It is preferred that all knots have a similar degree of tightness as this is enhances the welfare of the horse. It is for example very difficult to obtain a uniform degree of tightness of fastening of knots when using elastic bands or needle and thread. This problem is overcome by using a device according to the invention.

In a possible embodiment of the device comprises the limiter two distal ends, wherein each distal end is configured for engaging a different strand of mane which are part of the braid. A benefit of this configuration is that during use of the device the braid is engaged at at least two separate locations, such that the limiter provides stability to the device when applied.

In a preferred embodiment at least one of the distal end comprises a retainer element for retaining the limiter with respect to the knot. In a preferred embodiment the retainer element is configured to be received in the knot. The presence of a retainer element may enhance the stability of the device with respect to the knot. It also contributes to the limitation of the movement of the device in the stitching direction. A retainer element according to the invention may for example be configured as a pin or a hook. In a possible embodiment also the stop may be provided with at least one retainer element. The securing element may be formed by deforming at least part of the second part of the pin. During the deformation the securing element is formed out of the second part of the pin, which ensures that the knot may keep its folded or rolled up position. Once the pin is pierced through the knot, such that the first part of the pin is received in the knot and wherein part of the second part of the pin protrudes from the knot, the protruding part may be deformed. The second part of the pin is preferably deformed such that part of the deformed part engages at least a part of the knot. It is even possible to deform the second part of the pin such that the second part of the pin follows the shape of the knot. The deformation of the second part may be in any angle and/or any direction as suited in specific conditions of use. The location and degree of deformation may also be varied to adjust the tightness of the knot.

Forming a securing element by deforming at least part of the second part of the pin has as a benefit that the chance that the knots are fastened too tight or too loose is little, as the deformation may be easily adapted to the dimensions of the knot.

Preferably the pin is therefore of substantial rigidity such that the pin may be deformed by the user when a force is applied, but may also remain substantially straight while the pin pierces the knot.

In a possible embodiment of the device comprises the second part of the pin at least one groove, or any other type of deformation, at at least one predetermined position in order to allocate and/or to simplify deformation. The presence of such groove or other type of deformation may thus enhance the ease of use.

It is also possible that the securing element is formed by a releasable securing element like for instance a cap. The benefit of using a releasable securing element is that optionally less force has to be applied to provide securing of the device with respect to the knot. A device according the invention may be used multiple times. However, the lifespan of the device will likely increase when the device does not have to be deformed.

The use of a securing cap has furthermore similar benefits as described above regarding the ability to choose for a specific degree of tightening of a knot. It is also possible that the second part of the pin and the securing cap are provided with complementary locking elements. Locking between the pin and the cap may for example be obtained via a click-system or screw-system. It is possible to provide at least part of the second part of the pin with external screw thread and that the securing cap is provided with complementary internal screw thread. It is also possible that the device comprises both a securing element formed by deformation of at least part of the second part of the pin and a releasable securing cap.

The equine grooming device according to the invention may be configured of any suitable material or material combination, for example metal, plastic and/or rubber. It is, however, of importance that the equine grooming device, and in particular the pin of the equine grooming device, is substantially rigid, such that deformation of the pin does not occur when the device is pierced through the knot.

In a preferred embodiment is the shape of the pin at least substantially cylindrical, as this increases the ease of protruding of the device through the knot. In a possible embodiment of the equine grooming device the pin and the limiter constitute out of a single piece. In a further embodiment the limiter may comprise at least one gripping element. The presence of a gripping may improve the ease of use, especially the removal, of the device.

The invention also relates to a method for use of an equine grooming device for keeping a horse mane's braid in a rolled up or folded knot according claim 12. A preferred method according the invention comprises the subsequent steps of providing a section of mane of a horse with a braid, rolling or folding the braid into a knot, pulling the pin of the device through the knot in a stitching direction such that the second part of the pin protrudes from the knot, and securing the device with respect to the knot by forming a securing element and/or by receiving a securing element. The method may also comprise the steps of un-securing of the device and removal of the device by pulling and/or pushing the device out of the knot in a direction reverse to the stitching direction. The device may be secured with respect to the knot by deforming at least part of the second part of the pin and/or by applying a releasable securing cap to the second part of the pin. For the advantages of the method reference is made to the advantages as already mentioned before in relation to the equine grooming device according the present invention.

BRIEF DESCRIPTION OF THE DRAWINGS

The invention will be further elucidated herein below on the basis of the non-limitative exemplary embodiments shown in the following figures. Herein shows.

DETAILED DESCRIPTION OF THE PREFERRED EMBODIMENTS

FIGS. 1a-f show several alternative embodiments of equine grooming devices (1a-f) according to the invention, and several alternative securing elements (2a-d) according to the invention. Similar reference numbers refer to functional similar but alternative embodied features.

Figure 1A:
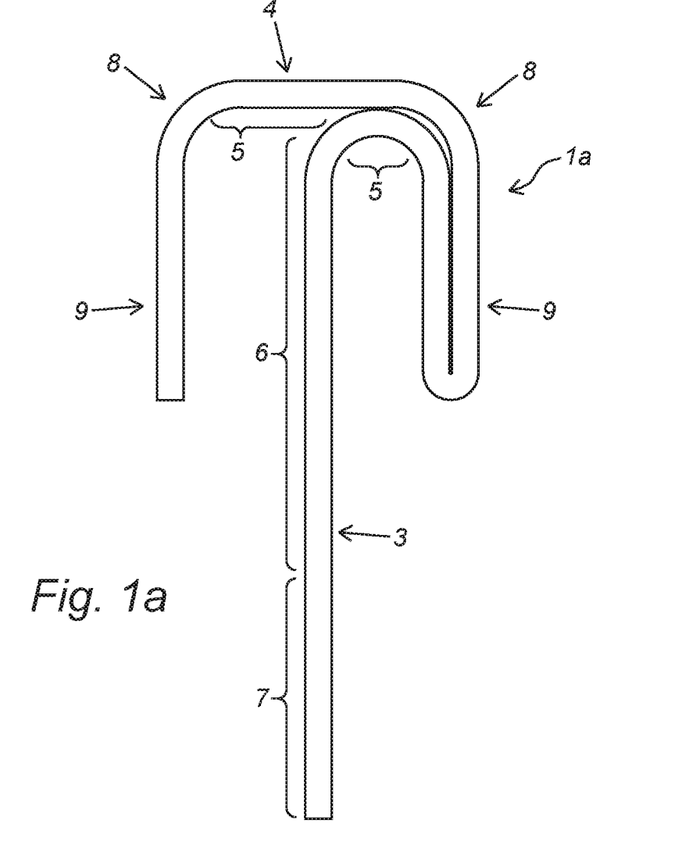
FIG. 1a a first possible embodiment of an equine grooming device according to the invention.

FIG. 1a shows a first embodiment of an equine grooming device (1a) for keeping a horse mane's braid in a rolled up or folded knot according to the invention. The device (1a) comprises a pin (3) for piercing at least a part of a knot (not shown) in a stitching direction and a limiter (4) connected to the pin (3). The limiter (4) comprises a stop (5) configured for engaging a first side of the knot. The pin (3) comprises a first substantially elongated part (6) configured to be received in the knot and a second part (7) for securing the device (1) with respect to the knot by forming a securing element and/or by receiving a securing element (not shown). The limiter (4) comprises two distal ends (8) which are configured for engaging a strand of mane being part of the braid. In the embodiment shown in FIG. 1a, each distal end (8) comprises a retainer element (9). In the embodiment of FIG. 1a the retainer elements (9) are pin-like elements, which are configured to be received in the knot. The second part (7) of the pin (3) is configured to be deformed in order to form a securing element. The embodiment of the equine grooming device (1a) as shown in FIG. 1a is put together out of a single piece of wire.

Figure 1B:
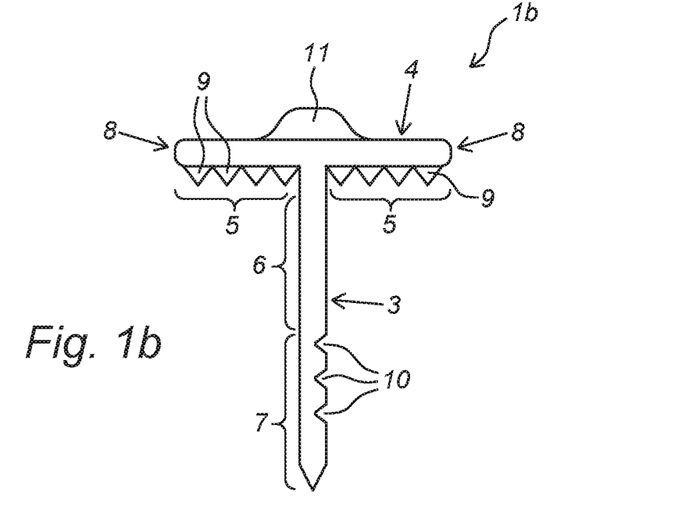
FIG. 1b a second possible embodiment of an equine grooming device according to the invention.

FIG. 1b shows a second embodiment of an equine grooming device (1b) according to the invention. The device (1b) has a T-shaped configuration and comprises a pin (3) and a limiter (4) connected therewith. The stop (5) is provided with a plurality of cone-shaped retainer elements (9).

The second part (7) of the pin (3) is provided with a cone-shaped distal end. The cone-shape may enhance the ease of piercing the pin (3) through the knot. The second part (7) of the pin (3) comprises a plurality of grooves (10) resulting in that the second part (7) is relatively easy deformable in order to form a securing element. In the embodiment shown in FIG. 1b the second part (7) of the pin (3) comprises three grooves (10), however, it is also possible that the pin (3) comprises any other number of grooves. Furthermore, the device (1b) comprises a gripping element (11) which enables easier handling of the device (1b).

Figure 1C:
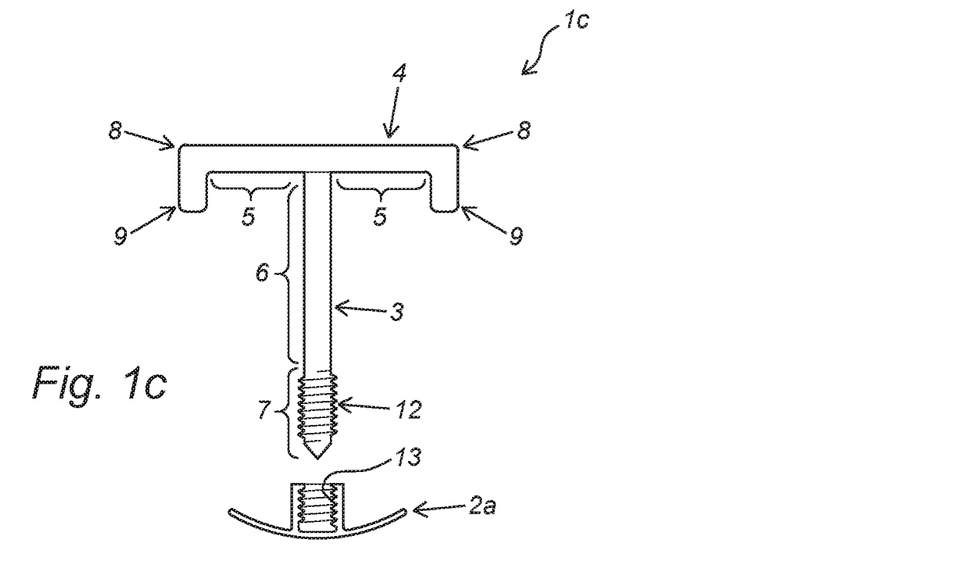
FIG. 1c an assembly of a third possible embodiment of an equine grooming device and a first possible embodiment of a securing cap according to the invention.

FIG. 1c shows an assembly of a third embodiment of an equine grooming device (1c) according to the invention including a releasable securing cap (2a). A difference between the device (1c) shown here and the embodiments (1a, 1b) as shown in FIG. 1a and FIG. 1b is that the second part (7) of the pin (3) is not intended to be deformed. To co-act with the securing cap (2a) the second part (7) of the pin (3) comprises external screw thread (12). The securing cap (2a) is provided with complementary internal screw thread (13). It may be understood that the securing cap (2a) is attachable to second part (7) of the pin (3) by means of rotation of the securing cap (2a) with respect to the pin (3). The securing cap (2a) is configured to engage the knot, however when in use, the device (2a) may both be outside the knot or at least partially received in the knot.

Figure 1D:
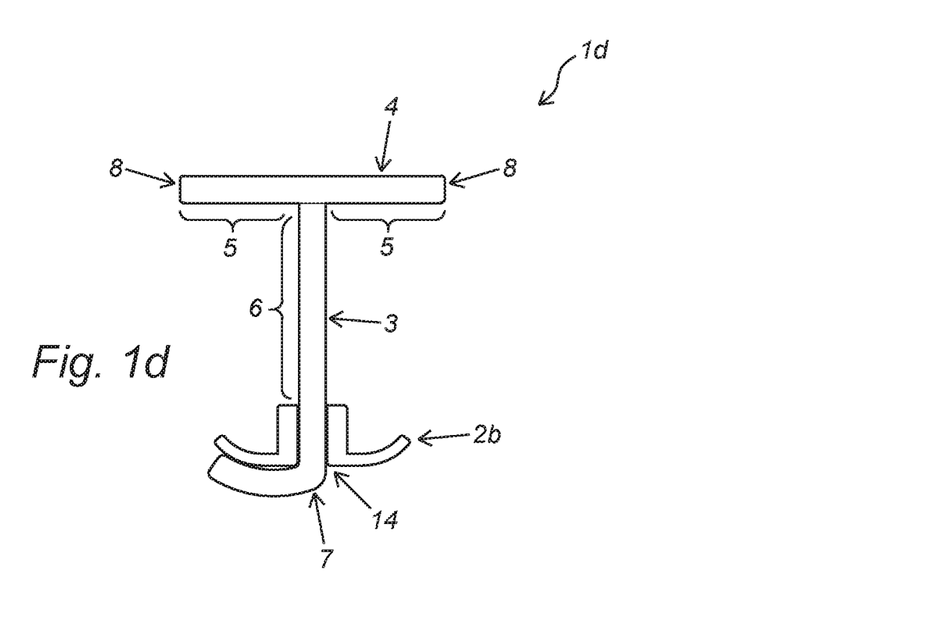
FIG. 1d an assembly of a fourth possible embodiment of an equine grooming device and a second possible embodiment of a securing cap according to the invention.

FIG. 1d shows an assembly of a fourth embodiment of an equine grooming device (1d) according to the invention including an alternative embodied securing cap (2b). The securing cap (2b) as shown in FIG. 1d has an opening (14) in the bottom part of the device (2b). The opening (14) is configured to enable protrusion of at least part of the pin (3). FIG. 1d shows a part of the second part (7) of the pin (3) protruding through the opening (14) of the securing cap (2b). The protruded part (7) is deformed in order to enable securing of the device (1d) with respect to the knot when in use. The knot will be engaged by both the securing element (2a) and the stop (5).

Figure 1E:
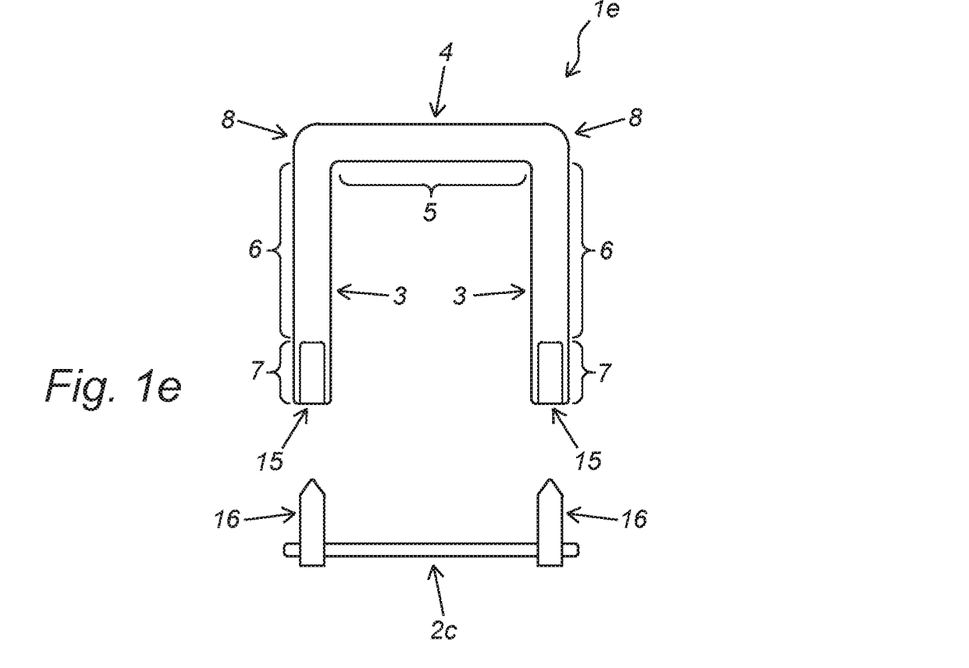
FIG. 1e an assembly of a fifth possible embodiment of an equine grooming device and a third possible embodiment of a securing cap according to the invention.

FIG. 1e shows an assembly of a fifth embodiment of an equine grooming device (1e) according to the invention including a further alternative embodied securing cap (2c). The grooming device (1e) comprises two pins (3). Each pin (3) is connected with a distal end (8) of the limiter (4). The second parts (7) of the pins (3) are provided with a receiving section (15) for receiving a part of the securing cap (2c). The securing cap (2c) comprises two pin-shaped elements (16) which are mutually connected.

Figure 1F:
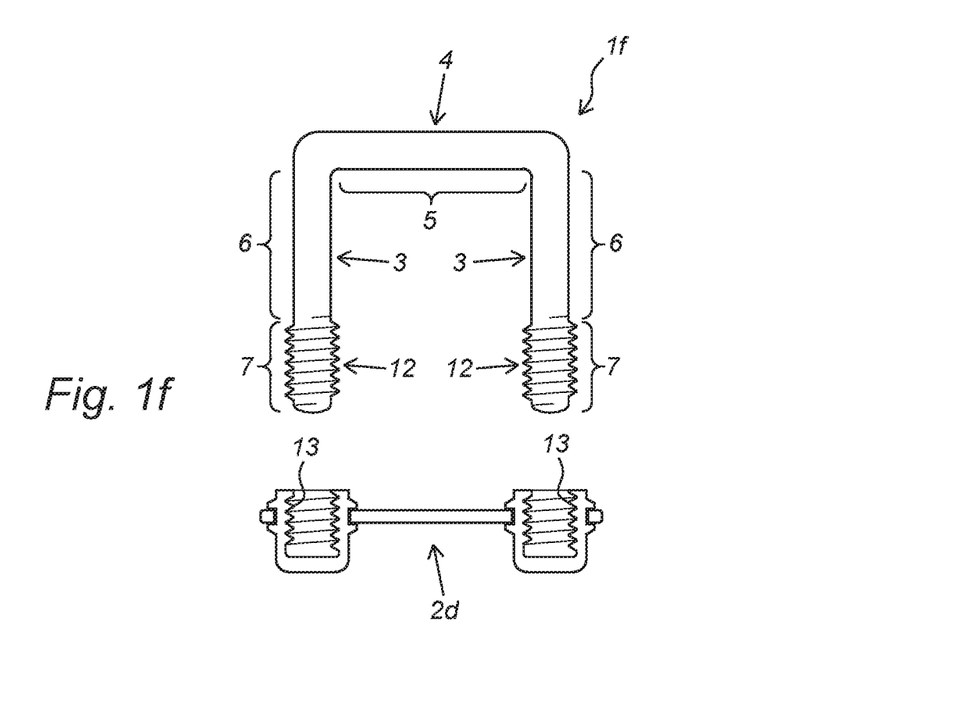
FIG. 1f an assembly of a sixth possible embodiment of an equine grooming device and a fourth possible embodiment of a securing cap according to the invention.

FIG. 1f shows an assembly of a sixth embodiment of an equine grooming device (1f) according to the invention including a third alternative embodied securing cap (2d). The shown embodiment comprises two pins (3), both are provided with external screw thread (12). The securing cap (2d) has complementary internal screw thread (13). FIGS. 2a-e show a schematic representation of the subsequent steps performed by using an equine grooming device according to the invention. Similar reference numbers may refer to functional similar but alternative embodied features. The figures show the use of the device (1) as shown in FIG. 1a.

Figure 2A:
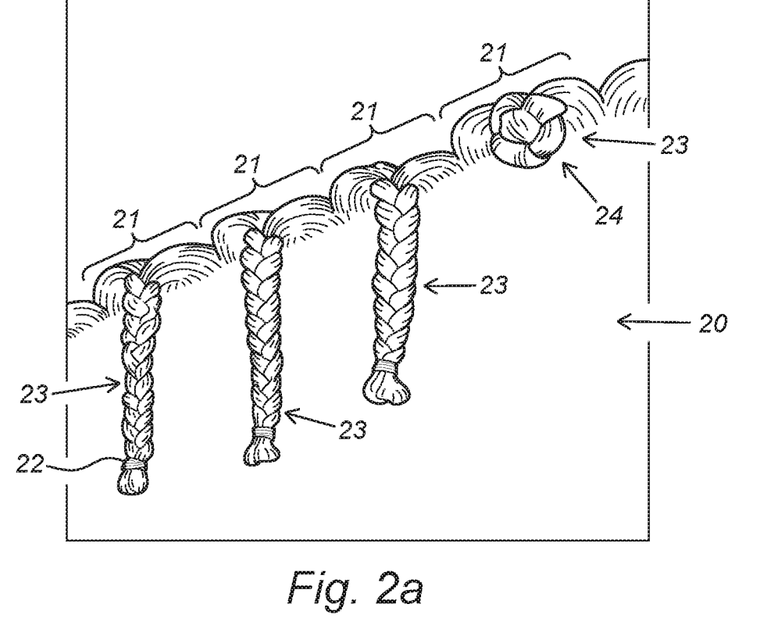
FIGS. 2a-e schematic representations of the subsequent steps performed during use of an equine grooming device according to the invention.

FIG. 2a shows a part of the neck (20) of a horse. The mane are divided in several sections (21). Each section (21) is braided all the way down and fastened with an elastic band (22). The figure shows already the desired result where a braid (23) is rolled up into a knot (24). In the following figures will be shown how the knot may be kept in this position by making of a device (1) according to the invention.

Figure 2B:
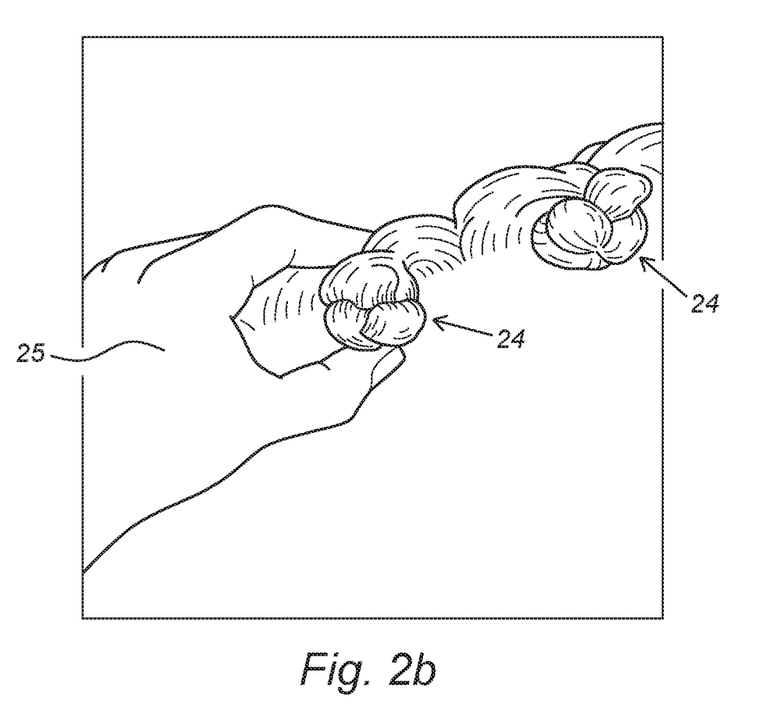
Figure 2C:
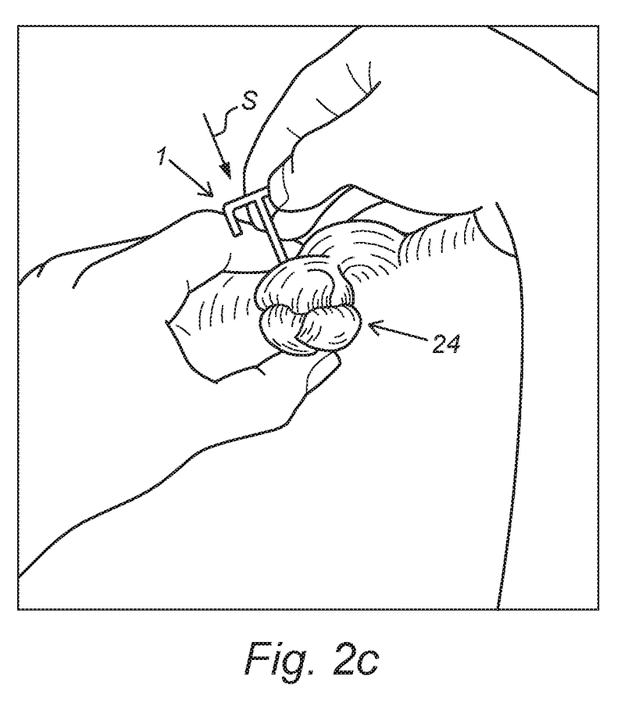

FIG. 2b shows that the user (25) has rolled the braid (23) into a knot (24). The user holds the knot (24) between multiple fingers into the desired shape. Subsequently, as shown in FIG. 2c, the equine grooming device (1) will be pulled through the knot (24) from a first side of the knot (24). The pin is pulled in a stitching direction (S). The limiter which is connected to the pin provided limiting of the moment of the device (1) in the stitching direction (S) once the stop of the device (1) engages the first side of the knot (24).

Figure 2D:
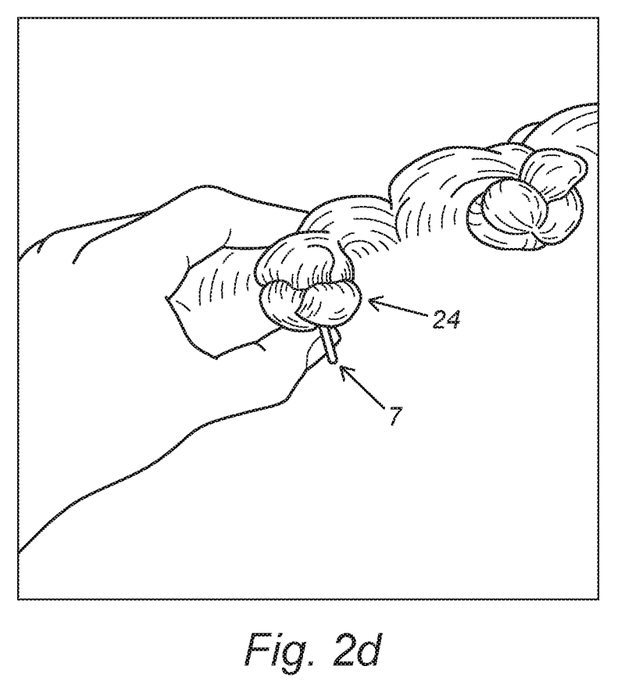

FIG. 2d shows that the device is pulled at least partially through the knot (24), such that a part of the second part (7) of the pin extends from the knot (24). A first part of the pin is received in the knot (24). The knot (24) is still held into the desired final shape by the groom.

Figure 2E:
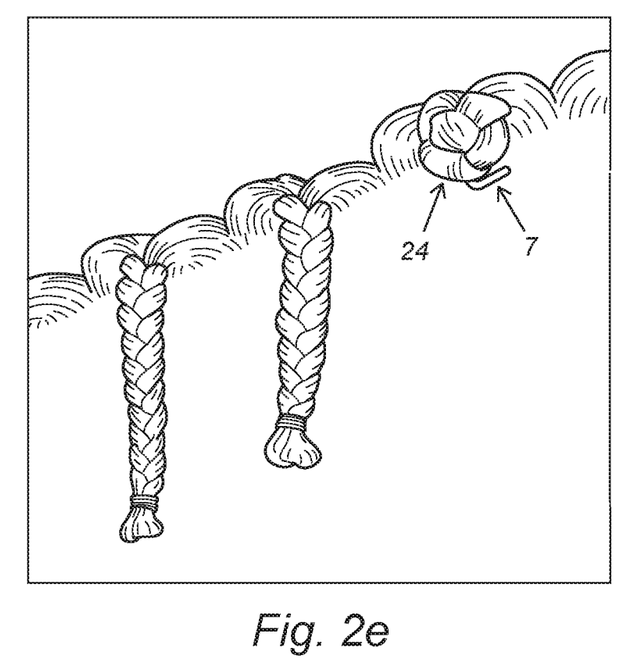

FIG. 2e shows the final result of the knot (24). This result is obtained by deformation of the protruding second part (7). The deformed part (7) of the pin forms a securing element and presents movement of the pin in a direction reverse to the stitching direction.

Figure 2F:
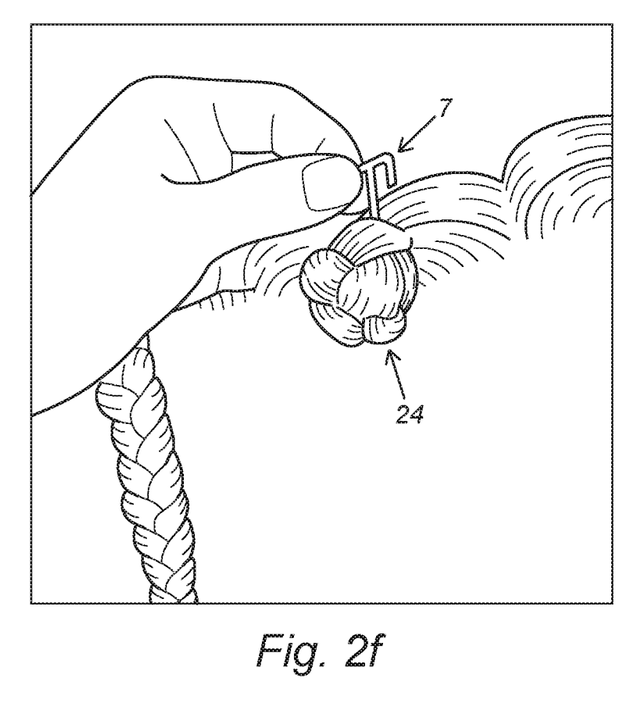
FIG. 2f a schematic representation of the step of removal of the device after use as shown in FIGS. 2a-e.

FIG. 2f shows a schematic representation of the step of removal of the device (1) after bringing in as shown in FIGS. 2a-e. The deformed part (7) is deformed back more or less into its initial straight shape. Subsequently, the device (1) may be removed by pulling the device (1) out of the mane in a direction reverse to the stitching direction (see figure) and/or by pushing the second part (7) of the pin of the device (1) into a direction reverse to the stitching direction.

With the term "braiding", the term "plaiting" is included as well. It is further to be understood, that despite it is referred to "equine" and "horses", also donkeys, pony's, mules and other mammals comprising mane are disclosed. Furthermore besides applying the device for braiding mane, it is equally included in the invention to apply the device for the forelock and/or the tale of a horse.

The invention claimed is:

1. An equine grooming device for keeping a horse mane's braid in a rolled up or folded knot, comprising:

at least one pin for piercing at least a part of the knot in a stitching direction; and a limiter connected to the at least one pin, wherein the limiter comprises a stop configured for engagement of a first side of the knot in order to limit the movement of the device in the stitching direction;

wherein the at least one pin comprises:

a first substantially elongated part configured to be received in the knot, and a second part for securing the device with respect to the knot by forming a securing element, wherein the securing element is formed by deforming at least a portion of the second part of the pin relative to the first substantially elongated part of the pin such that the securing element is configured to prevent movement of the at least one pin in a direction reverse to the stitching direction.

2. The equine grooming device according to claim 1, wherein the limiter and the securing element are configured to enclose the knot at least partially.

3. The equine grooming device according to claim 1, wherein the limiter comprises two distal ends, wherein each distal end is configured for engaging a different strand of mane being part of the braid.

4. The equine grooming device according to claim 3, wherein at least one of the distal ends comprises a retainer element for retaining the limiter with respect to the knot.

5. The equine grooming device according to claim 1, wherein the securing element is formed by deforming at least part of the second part of the at least one pin.

6. The equine grooming device according to claim 5, wherein the second part of the pin comprises at least one groove at a predetermined position in order to allocate deformation.

7. The equine grooming device according to claim 1, wherein the securing element is formed by a releasable securing cap.

8. The equine grooming device according to claim 7, wherein at least part of the second part of the pin is provided with external screw thread and wherein the securing cap is provided with complementary internal screw thread.

9. The equine grooming device according to claim 1, wherein the at least one pin has a substantially cylindrical shape.

10. The equine grooming device according to claim 1, wherein the at least one pin and the limiter constitute out of a single piece.

11. The equine grooming device according to claim 1, wherein the limiter comprises at least one gripping element.

12. The equine grooming device according to claim 1, wherein the at least one pin comprises only a single pin.

13. A method for use of an equine grooming device according to claim 1 for keeping a horse mane's braid in a rolled up or folded knot, comprising the steps:

providing a section of mane of a horse with a braid, rolling or folding the braid into a knot, pulling the at least one pin of the device through the knot in a stitching direction such that the second part of the at least one pin protrudes from the knot, and securing the device with respect to the knot by forming a securing element and/or by receiving a securing element.

14. The method according to claim 13, comprising the steps:

un-securing of the device, and removal of the device by pulling and/or pushing the device out of the knot in a direction reverse to the stitching direction.

15. The method according to claim 13, wherein the device is secured with respect to the knot by deforming at least part of the second part of the at least one pin.

16. The method according to claim 13, wherein the device is secured with respect to the knot by applying a releasable securing cap to the second part of the pin.

17. An equine grooming device for keeping a horse mane's braid in a rolled up or folded knot, comprising:

at least one pin for piercing at least a part of the knot in a stitching direction; and a limiter connected to the at least one pin, wherein the limiter comprises a stop configured for engagement of a first side of the knot in order to limit the movement of the device in the stitching direction;

wherein the at least one pin comprises:

a first substantially elongated part configured to be received in the knot, and a second part for securing the device with respect to the knot by forming a securing element and/or by receiving a securing element, wherein the securing element is configured to prevent movement of the at least one pin in a direction reverse to the stitching direction, wherein the limiter comprises two distal ends, wherein each distal end is configured for engaging a different strand of mane being part of the braid, wherein a first one of the distal ends comprises a first retainer element for retaining the limiter with respect to the knot, and wherein the first retainer element is a folded portion of the limiter.

18. The equine grooming device according to claim 17, wherein a second one of the distal ends comprises a second retainer element for retaining the limiter with respect to the knot, and wherein the second retainer element is an unfolded portion of the limiter.

* * * * *